US009005331B2

United States Patent
Adzic et al.

(10) Patent No.: US 9,005,331 B2
(45) Date of Patent: Apr. 14, 2015

(54) PLATINUM-COATED NON-NOBLE METAL-NOBLE METAL CORE-SHELL ELECTROCATALYSTS

(75) Inventors: Radoslav Adzic, East Setauket, NY (US); Junliang Zhang, Rochester, NY (US); Yibo Mo, Naperville, IL (US); Miomir Vukmirovic, Port Jefferson Station, NY (US)

(73) Assignee: Brookhaven Science Associates, LLC, Upton, NY (US)

( * ) Notice: Subject to any disclaimer, the term of this patent is extended or adjusted under 35 U.S.C. 154(b) by 1007 days.

(21) Appl. No.: 12/708,226

(22) Filed: Feb. 18, 2010

(65) Prior Publication Data

US 2010/0197490 A1 Aug. 5, 2010

Related U.S. Application Data

(63) Continuation-in-part of application No. 11/156,038, filed on Jun. 20, 2005, now Pat. No. 7,855,021, which is a continuation-in-part of application No. 11/019,759, filed on Dec. 22, 2004, now Pat. No. 7,691,780.

(60) Provisional application No. 61/153,424, filed on Feb. 18, 2009.

(51) Int. Cl.
  *B01J 23/44* (2006.01)
  *H01M 4/92* (2006.01)
  (Continued)

(52) U.S. Cl.
  CPC ............... *H01M 4/921* (2013.01); *B01J 23/44* (2013.01); *B01J 35/0013* (2013.01); *B82Y 30/00* (2013.01);
  (Continued)

(58) Field of Classification Search
  USPC ............ 75/255, 348, 351, 362; 502/101, 182, 502/185, 527.15, 527.24
  See application file for complete search history.

(56) References Cited

U.S. PATENT DOCUMENTS 3,340,097 A  9/1967 Hess et al.
3,645,860 A  2/1972 Fishman et al.
(Continued)

FOREIGN PATENT DOCUMENTS

EP  0 617 439 A2  9/1994
EP  0 952 241 A1  10/1999
(Continued)

OTHER PUBLICATIONS

J. Zhang, et al, *J. Phys. Chem. B.*, 108: 10955-10964 (2004).
(Continued)

*Primary Examiner* — Cynthia H Kelly
*Assistant Examiner* — Monique Wills
(74) *Attorney, Agent, or Firm* — Dorene M. Price; Lars O. Husebo

(57) ABSTRACT

Core-shell particles encapsulated by a thin film of a catalytically active metal are described. The particles are preferably nanoparticles comprising a non-noble core with a noble metal shell which preferably do not include Pt. The non-noble metal-noble metal core-shell nanoparticles are encapsulated by a catalytically active metal which is preferably Pt. The core-shell nanoparticles are preferably formed by prolonged elevated-temperature annealing of nanoparticle alloys in an inert environment. This causes the noble metal component to surface segregate and form an atomically thin shell. The Pt overlayer is formed by a process involving the underpotential deposition of a monolayer of a non-noble metal followed by immersion in a solution comprising a Pt salt. A thin Pt layer forms via the galvanic displacement of non-noble surface atoms by more noble Pt atoms in the salt. The overall process is a robust and cost-efficient method for forming Pt-coated non-noble metal-noble metal core-shell nanoparticles.

12 Claims, 5 Drawing Sheets

(51) Int. Cl.
*B82Y 30/00* (2011.01)
*H01M 4/86* (2006.01)
*B01J 35/00* (2006.01)
*H01M 8/10* (2006.01)

(52) U.S. Cl.
CPC ............ *H01M 4/8657* (2013.01); *H01M 4/926* (2013.01); *H01M 4/928* (2013.01); *H01M 2008/1095* (2013.01); *Y02E 60/50* (2013.01)

(56) References Cited

U.S. PATENT DOCUMENTS

| | | | |
|---|---|---|---|
| 3,857,737 | A | 12/1974 | Kemp et al. |
| 3,977,901 | A | 8/1976 | Buzzelli |
| 4,031,292 | A | 6/1977 | Hervert |
| 4,388,383 | A | 6/1983 | Heller |
| 4,426,269 | A | 1/1984 | Brown et al. |
| 4,716,087 | A | 12/1987 | Ito et al. |
| 4,794,054 | A | 12/1988 | Ito et al. |
| 4,822,699 | A | 4/1989 | Wan |
| 5,024,905 | A | 6/1991 | Itoh et al. |
| 5,132,193 | A | 7/1992 | Reddy et al. |
| 5,202,299 | A | 4/1993 | Symons et al. |
| 5,208,207 | A | 5/1993 | Stonehart et al. |
| 5,225,391 | A | 7/1993 | Stonehart et al. |
| 5,470,673 | A | 11/1995 | Tseung et al. |
| 5,683,829 | A | 11/1997 | Sarangapani |
| 5,702,836 | A | 12/1997 | Ma et al. |
| 5,759,944 | A | 6/1998 | Buchanan et al. |
| 5,795,669 | A | 8/1998 | Wilkinson et al. |
| 5,804,325 | A | 9/1998 | Yepez |
| 5,858,457 | A | 1/1999 | Brinker et al. |
| 5,922,487 | A | 7/1999 | Watanabe et al. |
| 6,007,934 | A | 12/1999 | Auer et al. |
| 6,183,894 | B1 | 2/2001 | Adzic et al. |
| 6,194,338 | B1 | 2/2001 | Andolfatto et al. |
| 6,200,457 | B1 | 3/2001 | Durand et al. |
| 6,232,264 | B1 | 5/2001 | Lukehart et al. |
| 6,284,402 | B1 | 9/2001 | Mallouk et al. |
| 6,326,098 | B1 | 12/2001 | Itoh et al. |
| 6,498,121 | B1 | 12/2002 | Gorer |
| 6,528,020 | B1 | 3/2003 | Dai et al. |
| 6,548,168 | B1 | 4/2003 | Mulvaney et al. |
| 6,585,947 | B1 | 7/2003 | Nayfeh et al. |
| 6,670,301 | B2 | 12/2003 | Adzic et al. |
| 6,749,892 | B2 | 6/2004 | Chang |
| 6,783,569 | B2 | 8/2004 | Cheon et al. |
| 6,815,391 | B2 | 11/2004 | Xing et al. |
| 7,001,669 | B2 | 2/2006 | Lu et al. |
| 7,205,255 | B2 * | 4/2007 | Yamamoto .................... 502/101 |
| 7,507,495 | B2 | 3/2009 | Wang et al. |
| 7,632,601 | B2 | 12/2009 | Adzic et al. |
| 2001/0002275 | A1 | 5/2001 | Oldenburg et al. |
| 2003/0068432 | A1 | 4/2003 | Dai et al. |
| 2003/0135971 | A1 | 7/2003 | Lieberman et al. |
| 2004/0055419 | A1 | 3/2004 | Kurihara et al. |
| 2004/0131762 | A1 | 7/2004 | Vigie et al. |
| 2006/0070491 | A1 * | 4/2006 | Yang et al. ....................... 75/255 |
| 2006/0135359 | A1 | 6/2006 | Adzic et al. |
| 2006/0263675 | A1 | 11/2006 | Adzic et al. |
| 2007/0026292 | A1 | 2/2007 | Adzic et al. |
| 2007/0031722 | A1 | 2/2007 | Adzic et al. |
| 2007/0264189 | A1 | 11/2007 | Adzic et al. |
| 2008/0128284 | A1 | 6/2008 | Penner et al. |

FOREIGN PATENT DOCUMENTS

| | | |
|---|---|---|
| EP | 0 850 204 B1 | 12/2001 |
| JP | 54146878 A2 | 11/1979 |
| JP | 11064263 A2 | 3/1999 |
| JP | 21133388 A2 | 5/2001 |
| JP | 23086192 A2 | 3/2003 |
| WO | WO 91/06036 | 5/1991 |

OTHER PUBLICATIONS

Toda, T., et al, *J. Electroanal. Chem.*, 460: 258-262 (1999).
Paulus, U., et al, *Electrochim. Acta.*, 47: 3787-3798 (2002).
Brankovic, S. R., et al, *Surf. Sci.*, 474: L173-L179 (2001).
Brankovic, S. R., et al, *Electrochem. Solid State Lett.*. 4: A217-A220 (2001).
Stamenkovic, V., et al, *J. Phys. Chem. B*, 106: 11970-11979 (2002).
Stamenkovic, V., et al, *J. Electroanal. Chem.*, 554-555: 191-199 (2003).
Peuckert, M., et al, *J. Electrochem. Soc*, 133: 944-947 (1986).
Rodriguez, J. A., et al, *Surf. Sci. Rep.*, 24: 223-287 (1996).
Schmidt, T. J., et al, *Electrochim. Acta.*, 47: 3765-3776 (2002).
Baldauf, M., et al, *J. Phys. Chem.*, 100: 11375-11381 (1996).
Naohara, H., et al, *Electrochim. Acta.*, 45: 3305-3309 (2000).
Meitzner, G., et al, *J. Phys. Chem.*, 96: 4960-4964 (1992).
Mukerjee, S., et al, *J. Electrochem. Soc.*, 142: 1409-1422 (1995).
Toda, T., et al, *J. Electrochem. Soc.*, 145: 4185-4188 (1998).
Sasaki, K., et al, *Electrochim. Acta.*, 48: 3841-3849 (2003).
Buatier de Mongeot, F., et al, *Surf. Sci.*, 411: 249-262 (1998).
Mrozek, M. F., et al, *Anal. Chem.*, 73: 5953-5960 (2001).
Chrzanowski, W., et al, *Langmuir*, 13: 5974-5978 (1997).
Chrzanowski, W., et al, *Catal. Lett.*, 50: 69-75 (1998).
Attard, G. A., et al, *J. Electroanal. Chem.*, 300: 467-485 (1991).
Llorka, M. J., et al, *J. Electroanal. Chem.*, 351: 299-319 (1993).
Zoval, J. V., et al, *J. Phys. Chem. B*, 102: 1166-1175 (1998).
Parsons, R., et al, *J. Electroanal. Chem.*, 257: 9-45 (1988).
Ma, et al, *Mater. Res. Soc. Proc.*, 332: 327-333 (1994).
Kadirgan, F., et al, *J. Electroanal. Chem.*, 125: 89-103 (1981).
Enyo, M., et al, *J. Appl. Electrochem.*, 15: 907-911 (1985).
Koljadko, J., et al, *J. Electroanal. Chem.*, 137:117-125 (1982).
Solla-Gullon, J., et al, *Electrochem. Commun.*, 4 (9): 716-721 (2002).
Brankovic, S. R., et al, *J. Electroanal. Chem.*, 503: 99-104 (2001).
Holmberg, K., *J. Colloid Interface Sci.*, 274: 355-364 (2004).
Penner, R.M., *Acc. Chem. Res.*, 33: 78-86 (2000).
Wang, J. X., et al.,*J. Electrochemical Society*, 150 (8): A1108-A1117 (2003).
Wang, J. X., et al., *J. Phys. Chem B*, 150: 4147-4133 (2004).
Uribe, F. A., et al., *Electrochimica Acta*, 47: 3799-3806 (2002).
Adzic, et al., US DOE Hydrogen, Fuel Cells & Infrastructure Technologies Program Review Meeting, Philadelphia, PA, May 24-27, 2004.
Adzic, et al., US DOE Hydrogen, Fuel Cells & Infrastructure Technologies Program Review Meeting, Washington, DC, May 23-26, 2005.
"Fuel cells and their applications," by K. Kordesch and G. Simader, New York, NY: VCH Publishers, Inc. (2001), Table of Contents, pp. 36-42, and pp. 72-92.
Adzic, R., "Recent advances in the kinetics of oxygen reduction," Electrocatalysis, pp. 197-242 (1998).
Shi, Z., et al., "Synthesis of palladium nanostructures by spontaneous electroless deposition," Chem. Phys. Lett., 422, 147 (2006).
Xiong, Y., et al., "Synthesis and mechanistic study of palladium nanobars and nanorods," J. Am. Chem. Soc. 129, 3665 (2007), and Supporting Information pp. S1-S8.
Xiong, Y., et al., "Synthesis and characterization of fivefold twinned nanorods and right bipyramids of palladium," Chem. Phys. Lett. 440, 273 (2007).
Zhang, J., et al., "Platinum monolayer on nonnoble metal-noble metal core-shell nanoparticle electrocatalysts for O2 reduction," J. Phys. Chem. B. 109, 22701 (2005), and 1 page of Supporting Information.
Zhang, J., et al., "Controlling the catalytic activity of platinum-monolayer electrocatalysts for oxygen reduction with different substrates," Angew. Chem. Int. Ed, 44, 2132 (2005).
Zhang, J., et al., "Stabilization of platinum oxygen-reduction electrocatalysts using gold clusters," Science, 315, 220 (2007) , and 9 pages of Supporting Online Material.
Diaz-Ayala, R., et al., "Palladium nanostructures and nanoparticles from molecular precursors on highly ordered pyrolytic graphite," Langmuir, 22, 10185 (2006).

* cited by examiner

PLATINUM-COATED NON-NOBLE METAL-NOBLE METAL CORE-SHELL ELECTROCATALYSTS

This application claims priority under 35 U.S.C. §119(e) to U.S. Provisional Patent Application No. 61/153,424 which was filed on Feb. 18, 2009, and is a continuation-in-part of and claims priority under 35 U.S.C. §120 to co-pending U.S. patent application Ser. No. 11/156,038 which was filed on Jun. 20, 2005 and which, in turn, is a continuation-in-part of and claims priority under 35 U.S.C. §120 to co-pending U.S. patent application Ser. No. 11/019,759 which was filed on Dec. 22, 2004, the entirety of all of which are incorporated by reference as if fully set forth in this specification.

This invention was made with Government support under contract number. DE-AC02-98CH10886, awarded by the U.S. Department of Energy. The Government has certain rights in the invention.

BACKGROUND OF THE INVENTION

I. Field of the Invention

This invention relates generally to core-shell electrocatalyst supports. In particular, the present invention relates to core-shell electrocatalyst particles, their method of fabrication, and the controlled deposition of a contiguous catalytically active layer on the thus-formed core-shell electrocatalyst particles. This invention further relates to the use of these electrocatalysts in the electrodes of energy conversion devices such as fuel cells.

II. Background of the Related Art

A fuel cell is an electrochemical device capable of converting the chemical energy of a fuel and an oxidant into electrical energy. A standard fuel cell is comprised of an anode and cathode separated by a conducting electrolyte which electrically insulates the electrodes yet permits the flow of ions between them. The fuel cell operates by separating electrons and ions from the fuel at the anode and transporting the electrons through an external circuit to the cathode. The ions are concurrently transported through the electrolyte to the cathode where the oxidant is combined with the ions and electrons to form a waste product. An electrical circuit is completed by the concomitant flow of ions from the anode to cathode via the conducting electrolyte and the flow of electrons from the anode to the cathode via the external circuit.

The science and technology of fuel cells has received considerable attention, being the subject of numerous books and journal articles including, for example, "Fuel Cells and Their Applications," by K. Kordesch and G. Simader, New York, N.Y.: VCH Publishers, Inc. (2001). Although there are various types of fuels and oxidants which may be used, the most significant is the hydrogen-oxygen system. In a hydrogen-oxygen fuel cell, hydrogen ($H_2$) is supplied to the anode as the fuel where it dissociates into $H^+$ ions and provides electrons to the external circuit. Oxygen ($O_2$) supplied to the cathode undergoes a reduction reaction in which $O_2$ combines with electrons from the external circuit and ions in the electrolyte to form $H_2O$ as a byproduct. The overall reaction pathways leading to oxidation at the anode and reduction at the cathode are strongly dependent on the materials used as the electrodes and the type of electrolyte.

Under standard operating conditions the $H_2$ and $O_2$ oxidation/reduction reactions proceed very slowly, if at all, requiring elevated temperatures and/or high electrode potentials to proceed. Reaction kinetics at the electrodes may be accelerated by the use of noble metals such as platinum (Pt), palladium (Pd), ruthenium (Ru), and related noble metal-containing alloys. Electrodes formed of these materials function as electrocatalysts since they accelerate electrochemical reactions at electrode surfaces yet are not themselves consumed by the overall reaction. Further improvements have been attained by incorporating noble metal-containing particles or structures with reduced dimensions. A reduction to nanoscale dimensions yields a significant increase in the surface-to-volume ratio, producing a concomitant increase in the surface area available for reaction. Despite the performance improvements attainable with nanoscale electrocatalysts, successful commercialization of fuel cells requires still further increases in performance, stability, and cost efficiency.

Pt has been shown to be one of the best electrocatalysts, but its successful implementation in commercially available fuel cells is hindered by its extremely high cost, susceptibility to carbon monoxide (CO) poisoning, poor stability under cyclic loading, and the relatively slow kinetics of $O_2$ reduction at the cathode. A variety of approaches have been employed in attempting to solve these problems. An example is U.S. Pat. No. 6,232,264 to Lukehart, et al. which discloses polymetallic nanoparticles such as platinum-palladium alloy nanoparticles for use as fuel cell electrocatalysts. Another example is U.S. Pat. No. 6,670,301 to Adzic, et al. which discloses a process for depositing a thin film of Pt on dispersed Ru nanoparticles supported on carbon (C) substrates. These approaches have resulted in electrocatalysts with reduced Pt loading and a higher tolerance for CO poisoning. Both of the aforementioned patents are incorporated by reference as if fully set forth in this specification.

Attempts to accelerate the oxidation reduction reaction (ORR) on Pt while simultaneously reducing Pt loading have been met with limited success. Recent approaches have utilized high surface area Pt or Pd nanoparticles supported by nanostructured carbon (Pt/C or Pd/C) as described, for example, in U.S. Pat. No. 6,815,391 to Xing, et al. which is incorporated by reference as if fully set forth in this specification. However, as an oxygen reduction catalyst, bulk Pt is still several times more active than Pt/C and Pd/C nanoparticle electrocatalysts. Despite the continued improvement attained with Pt-based electrocatalysts, successful implementation in commercial energy conversion devices such as fuel cells requires still further increases in the catalytic activity while simultaneously improving long-term stability and reducing the amount of costly precious metals required.

SUMMARY OF THE INVENTION

In view of the above-described problems, needs, and goals, some embodiments of the present invention provide electrocatalyst supports with minimal loading of noble metals and a concomitant enhancement in catalytic activity. Another aspect of the present invention is to provide a method of efficiently forming said electrocatalyst supports. In one embodiment this is accomplished by forming core-shell particles in which a non-noble metal core is surrounded by a shell of a noble metal. The use of a non-noble metal as the primary bulk constituent minimizes loading of more costly noble metals whereas the noble metal shell protects the underlying core from dissolution during exposure to corrosive environments. The core-shell particle is preferably at least partially encapsulated by a thin film of a catalytically active material which provides active surface sites for reaction.

The core-shell particle preferably has external dimensions ranging from 1-100 nm and is thus a nanoparticle. In a preferred embodiment, the external dimensions of the core-shell nanoparticles are between a minimum of 2 nm and a maximum of 10 nm. The shape of the core-shell particle is preferably spherical, but is not so limited and may take on any shape as is well-known in the art. These include, but are not limited to, nanostructures which are spherical, pyramidal, rod-shaped, cubic, tubular, cuboctahedral, tetrahedral, wire-like, nanotube-like, and so forth. The catalytically active surface layer is preferably a contiguous thin film which encapsulates the core-shell nanoparticle with a surface coverage ranging from less than a monolayer to several monolayers. Such coated nanoparticles facilitate more efficient and cost-effective electrochemical energy conversion in fuel cells, metal-air batteries, and during corrosion processes.

In one embodiment, the nanoparticle core is preferably comprised of at least one non-noble transition metal, but may comprise a plurality of elements or components. When more than one transition metal is used, the alloy is preferably a homogeneous solid solution, but may have compositional nonuniformities. The non-noble transition metal is preferably at least one of iron (Fe), cobalt (Co), or nickel (Ni). In another preferred embodiment, the transition metal is preferably titanium (Ti), tungsten (W), tantalum (Ta), vanadium (V), or niobium (Nb) or their alloys with other transition metals, including noble metals. The shell is preferably a noble metal, but may be alloyed with one or more transition metals, including other noble metals. The shell is preferably atomically thin, having a thickness of preferably at least one ML, but may be several atomic layers. As an example, the outer shell may be comprised of a submonolayer, monolayer (ML), bilayer, trilayer, or combinations thereof, of atoms from the second and/or third row transition metals.

The composition of the shell itself is preferably homogeneous, but may also be nonuniform. The noble metal shell is preferably comprised of at least one of palladium (Pd), iridium (Ir), rhenium (Re), or gold (Au). Thus, in this embodiment the electrocatalyst is preferably a non-noble metal-noble metal core-shell nanoparticle. In an even more preferred embodiment, the shell is a noble metal other than platinum (Pt). Considering the scarcity and high cost of Pt, producing a core and shell without this more precious metal provides additional cost savings. Furthermore, the presence of geometric and/or electronic effects between the underlying shell and the catalytically active overlayer may serve to actually increase the catalytic activity per unit mass of Pt used.

The catalytically active surface layer is preferably a noble metal and, in an especially preferred embodiment is Pt. Surface coverage of the catalytically active layer on the core-shell nanoparticle may range from less than one monolayer to a few atomic layers, but is preferably one monolayer. Furthermore, the surface layer is not limited to a single noble metal, but may further comprise a mixture with one or more other transition metals. In a preferred embodiment, the electrocatalyst is a Pt-coated core-shell nanoparticle in which the core is a non-noble transition metal and the shell is a monolayer of a noble metal other than Pt.

The method of forming the core-shell nanoparticles preferably involves chemically reducing a mixture of a salt of a non-noble metal and a noble metal, with or without a carbon nanoparticle support, followed by drying the sample in an inert atmosphere. The dried sample is then annealed at elevated temperatures in an inert or reducing environment to drive segregation of the noble metal component to the surface. The annealing temperature preferably ranges from 200 to 800° C., more preferably 600 to 800° C. for times from one to five hours, more preferably one to two hours, depending on the particular metals used. The thus-formed non-noble metal-noble metal core-shell nanoparticles are then coated with a thin layer of a catalytically active metal. This process involves initially forming a continuous adlayer of a non-noble metal such as copper (Cu) on the surface of the core-shell nanoparticles by underpotential deposition (UPD). This is followed by immersing the nanoparticles in a solution comprising a noble metal salt which results in galvanic displacement of the non-noble metal by the noble metal. This method preferentially forms non-noble metal-noble metal core-shell nanoparticles in which the shell does not comprise Pt and which are conformally coated with a thin layer of Pt atoms.

An additional embodiment relates to the utilization of Pt-coated non-noble metal-noble metal core-shell nanoparticles in the electrodes of a fuel cell. In a preferred embodiment, the Pt-coated core-shell nanoparticle electrodes are used as the cathode to accelerate the kinetics of the ORR.

DETAILED DESCRIPTION OF THE INVENTION

Figure 1:
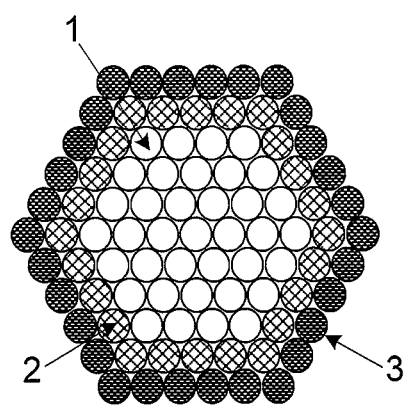
FIG. 1 is an atomic-scale cross-sectional illustration of a Pt-encapsulated core-shell nanoparticle.

These and other objectives of the invention will become more apparent from the following description and illustrative embodiments which are described in detail with reference to the accompanying drawings. In the interest of clarity, in describing the present invention, the following terms and acronyms are defined as provided below.

Acronyms

AES: Auger Electron Spectroscopy
ALD: Atomic Layer Deposition
CVD: Chemical Vapor Deposition
GC: Glassy Carbon
MBE: Molecular Beam Epitaxy
ML: Monolayer
ORR: Oxidation Reduction Reaction
UPD: Underpotential Deposition Definitions Adatom: An atom located on the surface of an underlying substrate.
Adlayer: A layer (of atoms or molecules) adsorbed to the surface of a substrate.
Bilayer: Two consecutive layers (of atoms or molecules) which occupy all available surface sites on each layer and coat the entire surface of the substrate.

Catalysis: A process by which the rate of a chemical reaction is increased by means of a substance (a catalyst) which is not itself consumed by the reaction.

Electrocatalysis: The process of catalyzing a half cell reaction at an electrode surface.

Electrodeposition: Another term for electroplating.

Electrolyte: A substance comprising free ions which behaves as an electrically conductive medium.

Electroplating: The process of using an electrical current to reduce cations of a desired material from solution to coat a conductive substrate with a thin layer of the material.

Monolayer: A single layer (of atoms or molecules) which occupies available surface sites and covers substantially the entire exposed surface of a substrate.

Multilayer: More than one layer (of atoms or molecules) on the surface, with each layer being sequentially stacked on top of the preceding layer.

Nanoparticle: Any manufactured structure or particle with nanometer-scale dimensions (i.e., 1-100 nm).

Noble metal: Metals which are extremely stable and inert, being resistant to corrosion or oxidation. These generally comprise ruthenium (Ru), rhodium (Rh), palladium (Pd), silver (Ag), rhenium (Re), osmium (Os), iridium (Ir), platinum (Pt), and gold (Au). Noble metals are frequently used as a passivating layer.

Non-noble metal: A metal which is not a noble metal.

Redox reaction: A chemical reaction in which an atom undergoes a change in oxidation number. This typically involves the loss of electrons by one entity accompanied by the gain of electrons by another entity.

Refractory metal: A class of metals with extraordinary resistance to heat and wear, but with generally poor resistance to oxidation and corrosion. These generally comprise tungsten (W), molybdenum (Mo), niobium (Nb), tantalum (Ta), and rhenium (Re).

Submonolayer: Surface (atom or molecular) coverages which are less than a monolayer.

Transition metal: Any element in the d-block of the periodic table which includes groups 3 to 12.

Trilayer: Three consecutive layers (of atoms or molecules) which occupy all available surface sites on each layer and coat the entire surface of the substrate.

The present invention is based on the realization that by forming nanoparticles comprising a core of a non-noble metal and a shell of a noble metal, loading of precious metals may be minimized while the available surface area is simultaneously maximized. The inclusion of a non-noble metal nanoparticle core reduces the amount of more costly noble metals required while simultaneously providing a large surface area. The noble metal shell provides a protective coating which shields the underlying core from disintegrating in corrosive environments. Catalytically active surface sites are provided by depositing a thin film of a more catalytically active noble metal. Platinum has been shown to be one of the most catalytically active, yet most expensive metals. The ratio of catalytically active Pt surface sites to the total number of Pt atoms may therefore be maximized by employing Pt-coated core-shell nanoparticles.

The core-shell structure is particularly advantageous when the Pt-coated particles are subjected to acidic conditions and/or oxidizing potentials. Such conditions are typical for most fuel cells, particularly in the cathodes of fuel cells. In this case, an outer shell of a noble metal shields the more reactive core from the corrosive environment and from oxidation. The shell also prevents the reactive core from diffusing to the surface where it may become dissolved. Accordingly, a core-shell particle provides the benefit of reducing loading of precious metals while enhancing the catalytic activity of surface platinum through geometric and/or electronic effects.

The particles disclosed and described in this specification are not limited to any particular shape or size, but are preferably nanoparticles with sizes ranging from 1 to 100 nm in one or more dimensions. However, the size is not so limited and may extend into the micrometer and millimeter size range. The shape is preferably spherical or spheroidal, but again is not so limited. Throughout this specification, the particles will be primarily disclosed and described as essentially spherical nanoparticles. It is to be understood, however, that the particles may take on any shape, size, and structure as is well-known in the art. This includes, but is not limited to, branching, conical, pyramidal, cubical, mesh, fiber, cuboctahedral, wire-like, and tubular nanoparticles. The nanoparticles may be agglomerated or dispersed, formed into ordered arrays, fabricated into an interconnected mesh structure, either formed on a supporting medium or suspended in a solution, and may have even or uneven size distributions. The particle shape and size is preferably configured so that the bonding configuration of surface atoms is such that their reactivity and, hence, their ability to function as a catalyst is increased.

I. Core-Shell Nanoparticle Synthesis

Nanometer-scale particles or nanoparticles have been formed from a wide variety of materials using a number of different techniques which involve both top-down and bottom-up approaches. Examples of the former include standard photolithography techniques, dip-pen nanolithography, and focused ion-beam etching. The latter comprises techniques such as electrodeposition or electroplating on templated substrates, laser ablation of a suitable target, vapor-liquid-solid growth of nanowires, and growth of surface nanostructures by sputtering, chemical vapor deposition (CVD) or molecular beam epitaxy (MBE) from suitable gas precursors and/or solid sources.

Nanoparticles may also be formed using conventional powder-processing techniques such as comminution, grinding, or chemical reactions. Examples of these processes include mechanical grinding in a ball mill, atomization of molten metal forced through an orifice at high velocity, centrifugal disintegration, sol-gel processing, or vaporization of a liquefied metal followed by supercooling in an inert gas stream. Powder-processing techniques are advantageous in that they are generally capable of producing large quantities of nanometer-scale particles with desired size distributions. Chemical routes involve solution-phase growth in which, as an example, sodium boronhydride, superhydride, hydrazine, or citrates may be used to reduce an aqueous or nonaqueous solution comprising salts of a non-noble metal and noble metal at room temperature. Alternatively, the salt mixtures may be reduced using $H_2$ gas at temperatures ranging from 150 to 1,000° C. These chemical reductive methods can be used, for example, to make nanoparticles of palladium (Pd), gold (Au), rhodium (Rh), iridium (Ir), ruthenium (Ru), osmium (Os), rhenium (Re), nickel (Ni), cobalt (Co), iron (Fe), and combinations thereof.

A core-shell nanoparticle is generally defined throughout this specification as a nanoparticle comprising a core of a non-noble metal which may or may not be alloyed with another transition metal. The core is covered with a thin film of a noble metal which forms the shell. Due to the scarcity and high cost of platinum (Pt), it is preferable to minimize the Pt content of the core and shell. Accordingly, the shell preferably does not contain Pt. The noble metal shell protects the underlying non-noble core from corrosion during exposure to, for example, the acid- or alkaline-based solutions used in subsequent processing steps and enables underpotential deposition (UPD) of the intermediary metal (e.g., Cu, Pb, Cd, Bi, Ag, Sn, or Tl) during the process for deposition of a catalytically active overlayer as detailed in Section II below. The combination of core and shell metals used may also be suitably selected to enhance the catalytic properties of the catalytic overlayer. This enhancement may be accomplished by electronic effects and/or by adjusting the lattice parameter of the surface shell to induce strain in the overlayer such that its catalytic activity increases. The combination of core and shell metals used may also be suitably selected to enhance the catalytic properties of the Pt monolayer. Although the catalytically active overlay is primarily described throughout this specification as being Pt due to its high catalytic activity, it is to be understood that any other element, alloy, or compound which provides suitable catalytic activity may be used. Some examples besides Pt include Pd, Ir, Ru, and mixed monolayers of these metals with Pt.

Core-shell nanoparticles may be fabricated by initially forming a nanoparticle alloy comprised of a non-noble transition metal such as, for example, nickel (Ni), cobalt (Co), or iron (Fe) along with a small quantity of a noble metal. A transition metal is defined as any metal within the d-block of the periodic table which corresponds to groups three through twelve and includes the first (top), second (middle), and third (bottom) rows. The relative quantities of the non-noble metal and noble metal may be optimized to minimize the quantity of precious metals required while simultaneously maximizing the surface catalytic activity. A core-shell system may be formed from nanoparticles comprising, for example, Ni—Au, Co—Pd, or Fe—Pd alloys. When using chemical synthesis routes, typical salts which may be used include $AuCl_3$, $NiCl_2$, $CoCl_2$, $FeSO_4$, and $PdCl_2$. Typical molar ratios used include 1:10 for Au/Ni and between 1:2 to 1:10 for Pd/Co and Pt/Co. Subsequent elevated temperature annealing of nanoparticles formed of these alloys under an inert or reducing environment for a specified time period drives surface segregation of the noble metal (e.g., Au or Pd). This may typically involve annealing at 200-800° C., more preferably 600-800° C. for 1-5 hours, more preferably 1-2 hours under an inert gas such as $N_2$ or a reducing gas such as $H_2$. The annealing temperature and time depends on the particular metals being treated. This results in a nanoparticle comprising a non-noble metal core surrounded by a noble metal shell having an atomic-scale thickness.

Chemical synthesis routes typically involve the use of a carbon powder which serves as a support for the nanoparticles which form as a result of chemical processing. The carbon powder particles are generally considerably larger than the metal nanoparticles which will adhere onto the surface of the underlying carbon. In this case, the nanoparticles are referred to as carbon-supported nanoparticles. As an example, methods of synthesizing Pt or Pd nanoparticles supported by nanostructured carbon (e.g., Pt/C or Pd/C) are provided in U.S. Pat. No. 6,815,391 to Xing, et al.

In another embodiment a nanoparticle core comprised of a non-noble metal either alone or alloyed with one or more transition metals may initially be formed using any of the powder-forming processes as detailed above. The non-noble metal core is not limited to Ni, Co, or Fe, but also may be a refractory metal such as titanium (Ti), tungsten (W), tantalum (Ta), vanadium (V), or niobium (Nb) or their alloys with other transition metals, including noble metals. This core may then be covered with a thin shell of Pd, Au, Ru or another noble metal which preferably does not include Pt by a suitable process such as electroless deposition or by chemical routes such as atomic layer deposition (ALD) or CVD. An illustrative example of a core-shell nanoparticle is shown in FIG. 1, where a core comprising atoms of a non-noble metal (1) is covered by a noble metal shell (2). The core-shell nanoparticle shown in FIG. 1 is encapsulated by a catalytically active layer (3) which is described in additional detail in Section II below. The illustration provided in FIG. 1 shows that the noble metal shell and catalytically active layer are each one monolayer thick. It is to be understood, however, that the thickness is not so limited. Furthermore, the size of the core-shell nanoparticle as depicted in FIG. 1 is merely provided for illustrative purposes and is not limiting.

It is to be understood that the methods of forming self-protecting nanoparticles as described above are merely exemplary; a plurality of alternate methods may be employed. Examples of other processes which may be used to fabricate core-shell nanoparticles include the use of strong surfactants or a non-aqueous solvent/surfactant. The desired composition, structure, and size range may be obtained via suitable adjustment of the processing parameters.

II. Deposition of a Catalytically Active Thin Film

Core-shell nanoparticle formation is followed by deposition of a catalytically active surface layer having thicknesses in the submonolayer-to-multilayer range. For purposes of this specification, a monolayer (ML) is formed when the surface of a material is fully covered by a single, closely packed layer comprising adatoms of another material which forms a chemical or physical bond with atoms at the surface of the first material. The surface is considered fully covered when all available surface lattice sites are occupied by an adatom of the absorbed material. If the surface is not completely covered by a single layer of the adsorbate, then the surface coverage is considered to be submonolayer. However, if a second or subsequent layers of material are deposited onto the first layer, then multilayer surface coverages (e.g., bilayer, trilayer, etc.) may result.

The catalytically active surface layer may be deposited using any of a wide variety of thin film deposition processes which are well-known in the art. These include, but are not limited to, thermal evaporation, CVD, MBE, pulsed laser deposition, sputtering, and ALD. A majority of these techniques require specialized equipment capable of attaining medium to ultrahigh vacuum conditions and providing precise control over the impinging flux of atoms. Consequently these deposition techniques tend to be prohibitively expensive.

Electrodeposition, on the other hand, is a robust, relatively low-cost deposition technique capable of controllably depositing thin films with thicknesses ranging from submonolayer coverages up to several microns. Electrodeposition may be carried out in aqueous or nonaqueous solutions as well as solutions comprising an ionic liquid. Within this specification it is to be understood that the terms electrodeposition and electroplating may be used interchangeably with each referring to the use of an electrochemical redox reaction to deposit a solid metallic composition onto a substrate from an aqueous or non-aqueous solution. The metallic composition itself may be deposited from a solution comprising a metal ion or a plurality of metal ions using methods well-known to those skilled in the art.

A new synthetic procedure which employs the principles of electrodeposition and galvanic displacement has been utilized by Brankovic, et al. (hereinafter "Brankovic") to deposit a monolayer of Pt onto Au(111) substrates and by Adzic, et al. (hereinafter "Adzic") to deposit Pt monolayers onto Pd(111)

and carbon-supported Pd nanoparticles. These procedures are described, for example, in "Metal Monolayer Deposition By Replacement Of Metal Adlayers On Electrode Surfaces," Surf. Sci., 474, L173 (2001) and U.S. Patent Publ. No. 2006/0135359, respectively. This process has also been described in detail by J. Zhang, et al. in "Platinum Monolayer Electrocatalysts for $O_2$ Reduction: Pt Monolayer On Pd(111) And On Carbon-Supported Pd Nanoparticles," J. Phys. Chem. B 108, 10955 (2004). Each of the aforementioned references is incorporated by reference as if fully set forth in this specification.

The deposition process is centered around a series of electrochemical reactions which, when performed sequentially, result in a film with the targeted coverage and composition. The procedure involves the initial formation of an adlayer of a metal onto a substrate by UPD. This is followed by the galvanic displacement of the adlayer by a more noble metal, resulting in the conformal deposition of a ML of the more noble metal on the substrate. The overall process involves the irreversible and spontaneous redox displacement of an adlayer of a non-noble metal by a more noble metal. This enables the controlled deposition of a thin, continuous layer of a desired metal. The process requires that the substrate metal be more noble than the metal undergoing deposition in order to avoid becoming oxidized. The redox reaction can be described by the following equation

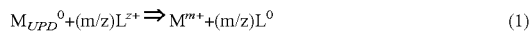

$$M_{UPD}^0 + (m/z)L^{z+} \rightleftharpoons M^{m+} + (m/z)L^0 \qquad (1)$$

where $M_{UPD}^0$ represents a UPD metal adatom on the electrode surface and $L^{z+}$ is a noble metal cation with positive charge z+ and valence z. The $M^{m+}$ represents the metal cation in the solution obtained after the UPD adatom was oxidized, and $L^0$ is a noble atom deposited in the redox process.

Although the catalytically active surface layer is not limited to any particular material, it is preferably Pt due to its excellent catalytic properties. Consequently, an example in which a monolayer of Pt is formed on nanoparticles using the processes described by Brankovic and Adzic will now be described in detail. It is to be understood, however, that the process is not limited to Pt and other metals may be utilized. The method involves the initial formation of a monolayer of a metal such as Cu by UPD in a solution comprised of 50 mM $CuSO_4$ in a 50 mM $H_2SO_4$ solution. The Cu-coated core-shell nanoparticles are then emersed from solution and rinsed with deionized water to remove $Cu^{2+}$ ions from the surface. This is followed by immersion in a solution comprised of 1.0 mM $K_2PtCl_4$ in 50 mM $H_2SO_4$ under a nitrogen gas atmosphere for approximately two minutes to replace all Cu atoms with Pt atoms. The Pt-coated core-shell nanoparticle substrate is again rinsed with deionized water. The above processes are carried out in a multi-compartment cell under a $N_2$ atmosphere in order to prevent Cu oxidation by $O_2$ during sample transfer.

The above process results in the conformal deposition of a ML of Pt on high-surface-area core-shell nanoparticles. The deposition cycle comprising UPD of Cu followed by galvanic displacement with Pt may be repeated as needed to produce two or more layers of Pt in order to ensure complete coverage of the core-shell nanoparticle surface. Conversely, the UPD of Cu may be controllably limited such that submonolayer coverages of Cu and, hence, Pt are obtained. The metal overlayer used is not limited to Pt, but may be formed from other metals with the only requirement being that the desired metal be more noble than the UPD adlayer. This may be accomplished by contacting the copper-coated particles with their corresponding salts. For example, monolayers of iridium, ruthenium, osmium, and rhenium can be deposited by displacement of a ML of a less noble metal such as copper, lead, cadmium, bismuth, silver, tin, or thallium using $IrCl_3$, $RuCl_3$, $OsCl_3$, or $ReCl_3$, respectively. Furthermore, the metal overlayer may be formed as an alloy with any number of constituents such as binary, ternary, quaternary, or quinary alloys with experimentally optimized stoichiometry ratios.

The process offers unprecedented control over film growth and is advantageous in terms of its versatility, reproducibility, and efficient utilization of source material. Since a costly precious metal such as Pt can be utilized as a thin film instead of in bulk form, significant cost savings can be attained. The utilization of a core-shell nanoparticle may also provide unexpectedly heightened catalytic activity due to synergistic effects between the surface of the core/shell nanoparticle and the catalytic overlayer. The unexpected increase in catalytic activity may arise due to electronic and geometric effects which arise from the formation of surface metal-metal bonds and the differing lattice constants of the catalytic overlayer and underlying substrate surface.

Figure 2:
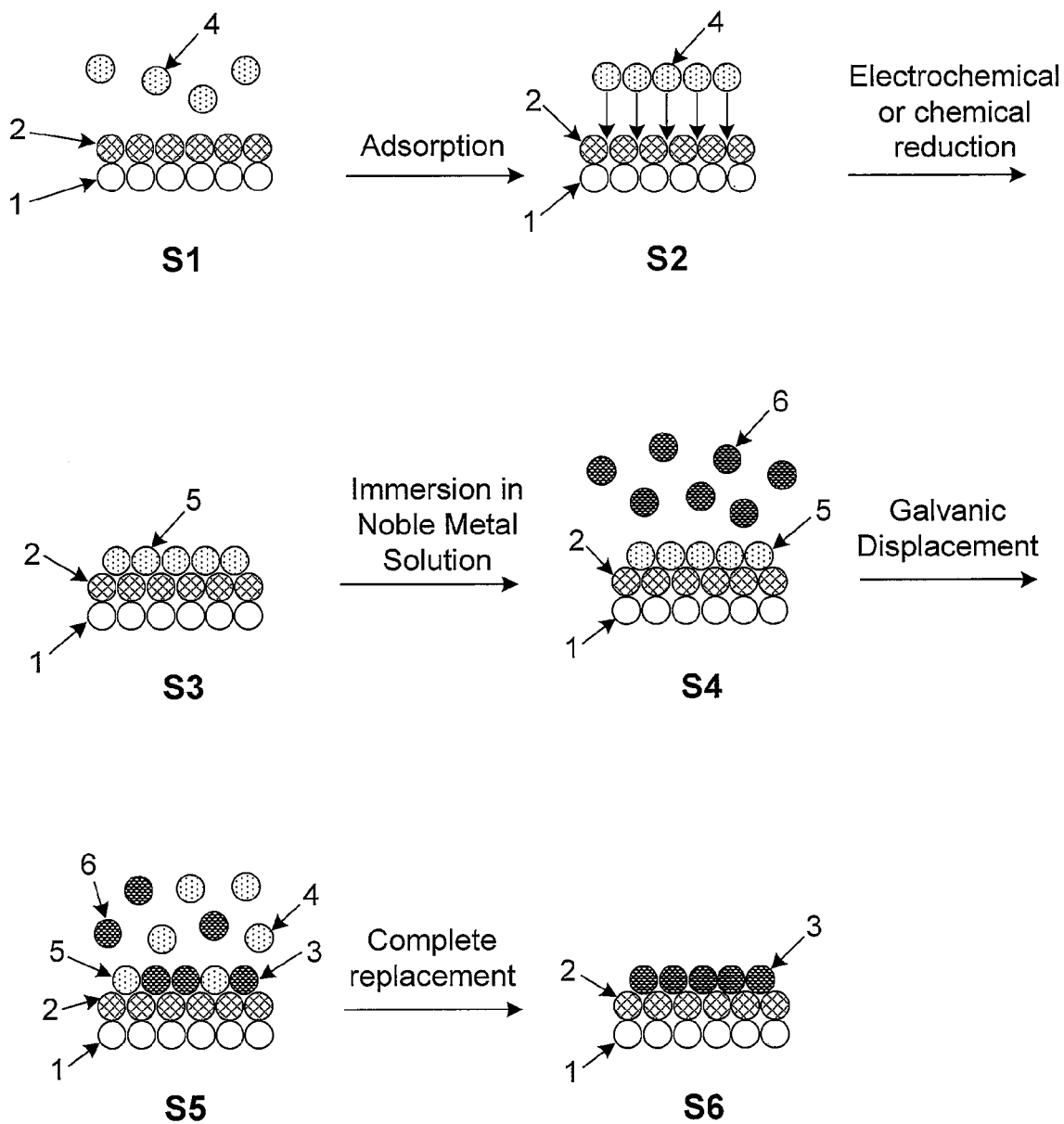
FIG. 2 shows a series of images illustrating the underpotential deposition of a Cu adlayer onto the surface of a core-shell nanoparticle followed by the galvanic displacement of Cu atoms by Pt.
Figure 3:
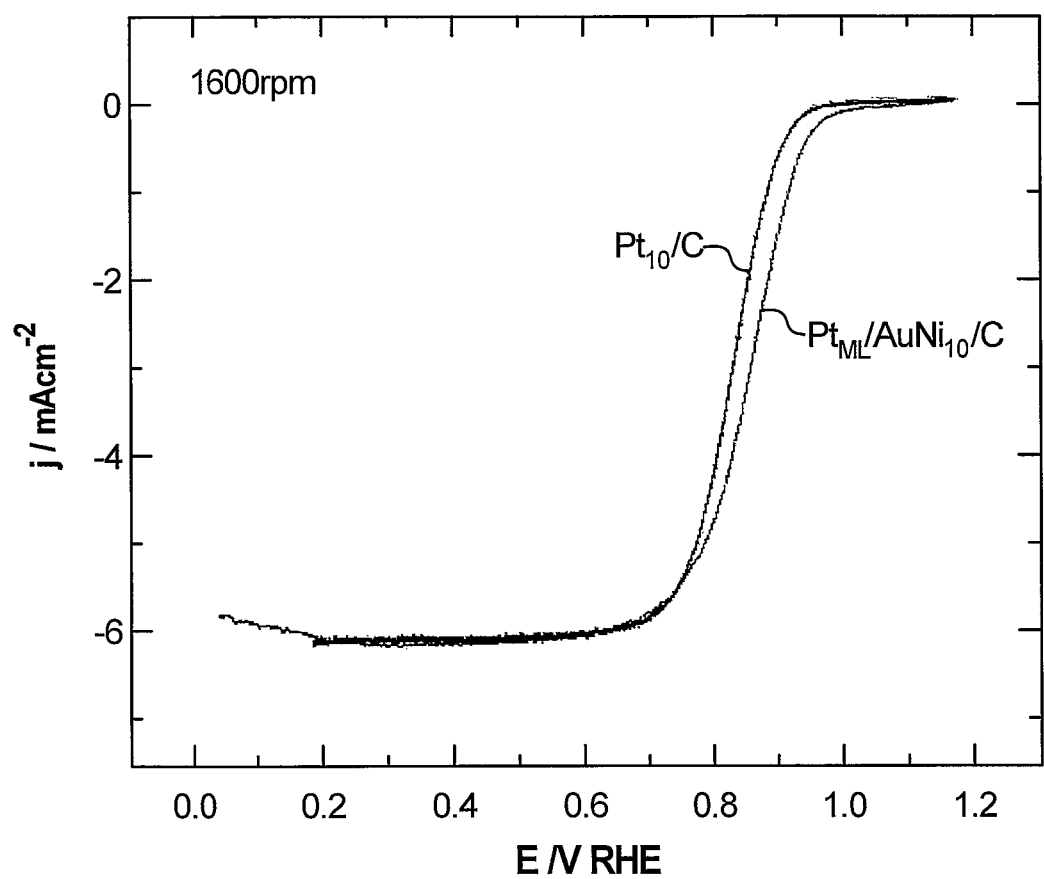
FIG. 3 is a plot showing a comparison of polarization curves for oxygen reduction on commercial platinum nanoparticles of 10 mmol Pt loading ($Pt_{10}/C$, left curve), and platinum-coated nickel-gold core-shell nanoparticles ($Pt_{ML}/AuNi_{10}/C$, right curve, where ML=monolayer)

Embodiments describing a method of forming a Pt overlayer on the surface of a core-shell nanoparticle will now be described in detail with reference to FIGS. 2-4. These embodiments are merely exemplary and are used to describe modes of practicing the invention. It is to be further understood that there are many other possible variations which do not deviate from the spirit and scope of the present invention.

III. Exemplary Embodiments

Exemplary embodiments of the present invention will now be described in detail below with reference to FIGS. 2-4. The desired core-shell nanoparticles may initially be formed using any of the plurality of methods described in Section I above. This is generally followed by the formation of an atomically thin encapsulating Pt layer as described in Section II above and illustrated in FIG. 2.

Example 1

In one embodiment sodium boronhydride is used to reduce a room-temperature suspension comprising $PdCl_2$ and $CoCl_2$ salts mixed in a 1:1 to 1:10 ratio. The sample is dried and then held in an inert or reducing environment at 600° C. for one hour to drive surface segregation of Pd atoms. For purposes of this embodiment, only the first two surface atomic layers of a self-protecting nanoparticle alloy are shown in FIG. 2. The nanoparticle surface in FIG. 2 shows a portion of the non-noble metal core (1) along with the noble metal shell (2) which, in this embodiment, are Co and Pd, respectively.

Non-noble metal ions of $Cu^{2+}$ (4) are initially adsorbed on the surface by immersing the nanoparticles in a plating bath comprising the appropriate concentration of $Cu^{2+}$ ions (4) in step S1. UPD of Cu results in the adsorption of $Cu^{2+}$ ions (4) on the nanoparticle surface in step S2 and the formation of a monolayer of Cu (5) in step S3. This monolayer forms a continuous Cu "skin" around the periphery of the core-shell nanoparticle. The core-shell nanoparticle is then emersed from the bath and rinsed with deionized water to remove excess $Cu^{2+}$ (4) ions on the surface. The sample is maintained under a $N_2$ atmosphere during transfer to inhibit oxidation of the freshly deposited Cu adlayer (5). The nanoparticle is then immersed in a solution comprising a Pt salt in step S4 where $Pt^{2+}$ ions (6) replace surface Cu adatoms (5) via a redox reaction as illustrated in step S5. Since Pt is more noble than Cu, it acts as an oxidizing agent by accepting electrons from Cu. The simultaneous reduction of $Pt^{2+}$ ions (6) to Pt (3) results in the replacement of surface Cu atoms (5) with Pt atoms (3). The final product is a Pt-coated Co/Pd core-shell nanoparticle with a "skin" comprising a monolayer of Pt atoms as shown in step S6 and illustrated in its entirety in FIG. 1.

The Pt-encapsulated core-shell nanoparticle cross-section in FIG. 1 shows that all atoms are close-packed in a hexagonal lattice, resulting in a hexagonal shape. It is to be understood, however, that the crystallographic structure is not limited to that shown and described in FIG. 1. The cycle depicted in FIG. 2 may be repeated any number of times to deposit additional layers of Pt onto the surface of the core-shell nanoparticle to ensure complete coverage. Conversely, less than a monolayer of Cu may be deposited during UPD such that submonolayer coverages of Pt result. While only a portion of the surface of a single core-shell nanoparticle is illustrated in FIG. 2, it is to be understood that Pt deposition will simultaneously occur on a large number of core-shell nanoparticles. The "skin" of Pt atoms will form a continuous and conformal coverage of the entire available surface area.

Example 2

In another embodiment a nickel core encapsulated by an atomically thin layer of gold was prepared by treating an aqueous suspension containing one equivalent of gold chloride ($AuCl_3$), ten equivalents of nickel chloride ($NiCl_2$), and carbon powder, with sodium borohydride art room temperature. The water of the resulting suspension of reduced metal was removed, and the resulting powder dried under an inert atmosphere. In order to ensure gold segregation onto the nickel surface, the dried powder was then annealed under a pure hydrogen gas environment at 600° C. for one hour. A platinum monolayer was deposited onto the gold-nickel particles by redox displacement by platinum of an adlayer of an underpotentially deposited (UPD) metal. In this example, Cu was used as the UPD metal on the gold-nickel/carbon nanoparticle substrate.

To prepare an electrode with gold-nickel nanoparticles, a dispersion of carbon-supported gold-nickel nanoparticles (AuNi/C) on a carbon substrate was made by sonicating the AuNi/C nanoparticles in water for about 5-10 minutes to make a uniform suspension. The carbon substrate used was Vulcan XC-72. Then, 5 microliters of this suspension was placed on a glassy carbon disc (GC) electrode and dried in air. The GC electrode holding the AuNI/C nanoparticles was then placed in a 50 mM $CuSO_4$/0.10M $H_2SO_4$ solution to electrodeposit Cu. After electrodeposition of a Cu ML, the electrode was rinsed to remove Cu ions from the electrode. The electrode was then placed in an aqueous solution containing 1.0 mM $K_2PtCl_4$ in 50 mM $H_2SO_4$ in a nitrogen atmosphere. After a 1-2 minute immersion to completely replace Cu by Pt, the electrode was rinsed again. The deposition of an atomic ML of Pt on AuNi nanoparticles was verified by voltammetry and Auger electron spectroscopy (AES). All of these operations were carried out in a multi-compartment cell in a nitrogen atmosphere that prevents the oxidation of Cu adatoms in contact with $O_2$.

The oxygen reduction electrocatalytic activity of Pt/AuNi/C nanoparticle composites was compared to the electrocatalytic activity of commercial Pt nanoparticle catalysts by measuring polarization curves using a rotating disc electrode operating at 1600 rpm. Examples are provided in FIG. 3 which provides electrocatalytic oxygen reduction curves obtained from Pt/AuNi/C and commercial Pt nanoparticle catalysts. The activity of the Pt ML on AuNi nanoparticles is higher (27 mV in half-wave potential) than that of Pt nanoparticles (61 nmol/cm$^2$). For the AuNi loading of 4.0 $\mu g_{Au}$/cm$^2$, the amount of Pt in the ML on this surface is 5.3 nmol/cm$^2$ (1.03 $\mu g_{Pt}$/cm$^2$). The half-wave potential for this electrode is 0.850 V. Notably, the activity of this surface is higher than that of 61 nmol/cm$^2$ (12 $\mu g_{Pt}$/cm$^2$) of Pt nanoparticles.

Figure 4:
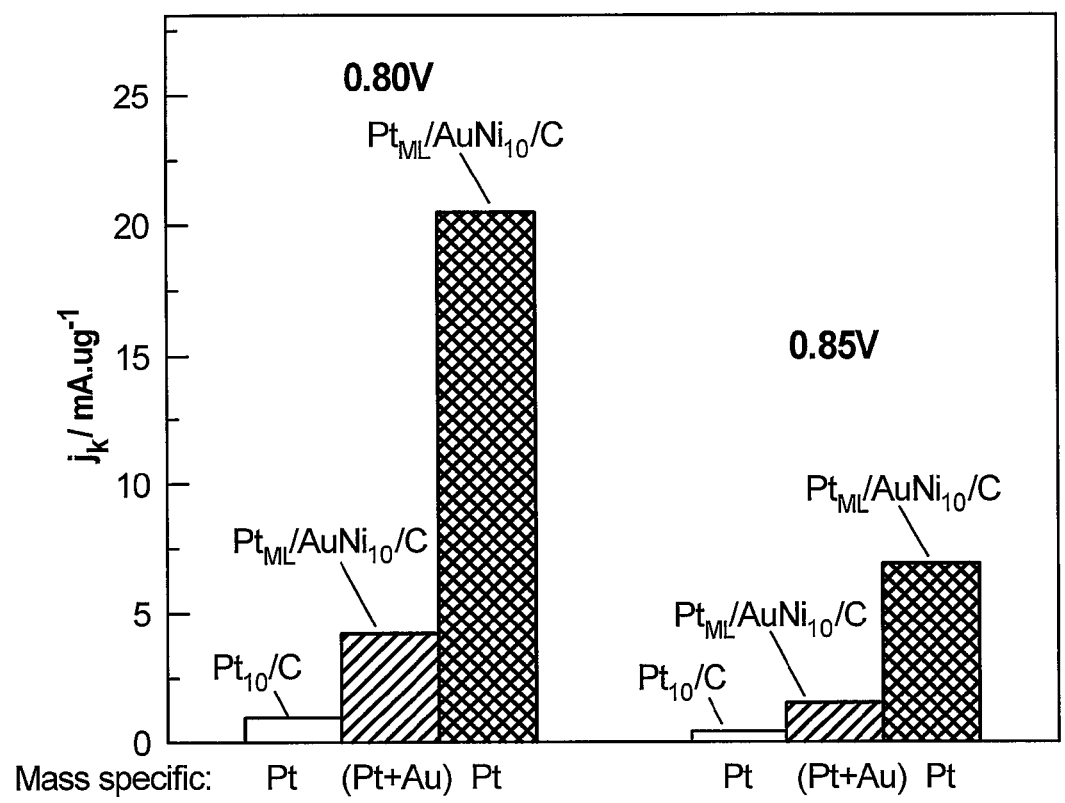
FIG. 4 shows a plot comparing the Pt and (Pt+Au) mass-specific activities of platinum nanoparticles of 10 nmol Pt loading ($Pt_{10}/C$) and platinum-coated nickel-gold core-shell nanoparticles ($Pt_{ML}/AuNi_{10}/C$) which are expressed as the current at 0.80 V and 0.85 V.

A comparison of the mass-specific activities of Pt/AuNi/C and $Pt_{10}$/C electrocatalysts is displayed in FIG. 4 expressed as the kinetic current $j_k$ in milliamps per microgram (mA/µg) at 0.85 V and 0.80 V divided by the Pt mass. The kinetic current $j_k$ provides a measure of the activity of the nanoparticles per unit mass of Pt that is included in the nanoparticles. Thus, the higher the value of $j_k$, the larger the catalytic activity attained per unit mass of Pt. The electrode having Pt ML particles (Pt/AuNi/C) has a twenty times higher mass-specific activity than the electrode with Pt nanoparticles. When the activity is calculated for the total noble metal content, Pt+Au, the activity is 4.16 mA/$\mu g_{(Pt+Au)}$, or 4 times that of Pt/C, which is still a significant higher activity.

IV. Energy Conversion Devices

In a preferred application, the Pt-coated core-shell nanoparticles as described above may be used as an electrode in a fuel cell. This application is, however, merely exemplary and is being used to describe a possible implementation of the present invention. Implementation as a fuel cell electrode is described, for example, in U.S. Patent Publ. No. 2006/0135359 to Adzic which is incorporated by reference as if fully set forth in this specification. It is to be understood that there are many possible applications which may include, but are not limited to $H_2$ sensors, charge storage devices, applications which involve corrosive processes, as well as various other types of electrochemical or catalytic devices.

Figure 5:
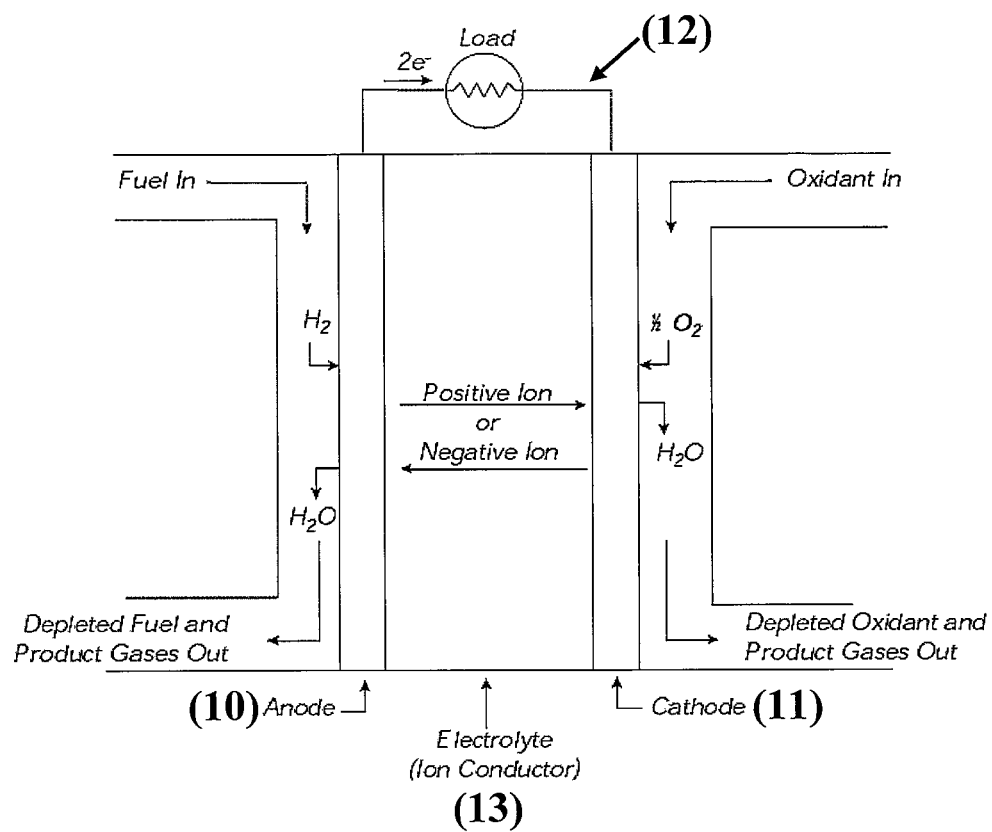
FIG. 5 is a schematic showing the principles of operation of a fuel cell in which at least one electrode may be comprised of Pt-encapsulated core-shell nanoparticles, according to the present invention.

A schematic showing an example of a fuel cell and its operation is provided in FIG. 5. A fuel such as hydrogen gas ($H_2$) is introduced through a first electrode (10) whereas an oxidant such as oxygen ($O_2$) is introduced through the second electrode (11). In the configuration shown in FIG. 3, the first electrode (10) is the anode and the second electrode (11) is the cathode. At least one electrode is comprised of Pt-coated core-shell nanoparticles which, in a preferred embodiment, have a non-noble core coated with a shell of a noble metal. Under standard operating conditions electrons and ions are separated from the fuel at the anode (10) such that the electrons are transported through an external circuit (12) and the ions pass through an electrolyte (13). At the cathode (11) the electrons and ions combine with the oxidant to form a waste product which, in this case, is $H_2O$. The electrical current flowing through the external circuit (12) can be used as electrical energy to power conventional electronic devices. The increase in the ORR attainable through incorporation of Pt-coated core-shell nanoparticles in one or more electrodes will produce an increase in the overall energy conversion efficiency of the fuel cell. Consequently, for a given quantity of fuel, a larger amount of electrical energy will be produced when using Pt-coated core-shell nanoparticle electrodes compared to conventional nanoparticle electrodes.

It will be appreciated by persons skilled in the art that the present invention is not limited to what has been particularly shown and described in this specification. Rather, the scope of the present invention is defined by the claims which follow. It should further be understood that the above description is only representative of illustrative examples of embodiments. For the reader's convenience, the above description has focused on a representative sample of possible embodiments, a sample that teaches the principles of the present invention.

Other embodiments may result from a different combination of portions of different embodiments.

The description has not attempted to exhaustively enumerate all possible variations. The alternate embodiments may not have been presented for a specific portion of the invention, and may result from a different combination of described portions, or that other undescribed alternate embodiments may be available for a portion, is not to be considered a disclaimer of those alternate embodiments. It will be appreciated that many of those undescribed embodiments are within the literal scope of the following claims, and others are equivalent. Furthermore, all references, publications, U.S. patents, and U.S. patent application Publications cited throughout this specification are incorporated by reference as if fully set forth in this specification.

The invention claimed is:

1. An electrocatalyst comprising:
    a core at least partially encapsulated by a shell to form a core-shell particle in which the core and shell have different compositions wherein the core and shell do not include Pt; and
    a layer of platinum atoms at least partially encapsulating the core-shell particle, wherein the layer of platinum atoms is one to three monolayers thick, and wherein the electrocatalyst promotes electrochemical reactions.

2. The electrocatalyst of claim 1 wherein the core comprises a non-noble metal.

3. The electrocatalyst of claim 1 wherein the shell comprises a noble metal.

4. The electrocatalyst of claim 3 wherein the shell is selected from the group consisting of Au, Pd, Ir, Ru, Os, and Re.

5. The electrocatalyst of claim 4 wherein the shell is one to three monolayers thick.

6. The electrocatalyst of claim 1 wherein the core-shell particle is a nanoparticle having dimensions of 1 to 100 nm along three orthogonal directions.

7. The electrocatalyst of claim 1 wherein the core-shell particle is spherical.

8. The electrocatalyst of claim 2, wherein the core is selected from the group consisting of Co, Ni, and Fe.

9. An electrocatalyst comprising:
    a core at least partially encapsulated by a shell to form a core-shell particle in which the core and shell have different compositions wherein the core comprises a metal selected from the group consisting of Co, Ni, and Fe, the shell comprises a metal selected from the group consisting of Au, Pd, Ir, Ru, Os, and Re, and the core and shell do not include Pt; and
    a layer of platinum atoms at least partially encapsulating the core-shell particle, wherein the layer of platinum atoms of is one to three monolayers thick, and wherein the electrocatalyst promotes electrochemical reactions.

10. The electro catalyst of claim 9 wherein the shell is one to three monolayers thick.

11. The electrocatalyst of claim 9 wherein the core-shell particle is a nanoparticle having dimensions of 1 to 100 nm along three orthogonal directions.

12. The electrocatalyst of claim 9 wherein the core-shell particle is spherical.

* * * * *